March 20, 1956  B. F. ARPS  2,739,017
HALF TRACK ATTACHMENT FOR TRACTORS
Filed Feb. 5, 1954  2 Sheets-Sheet 1
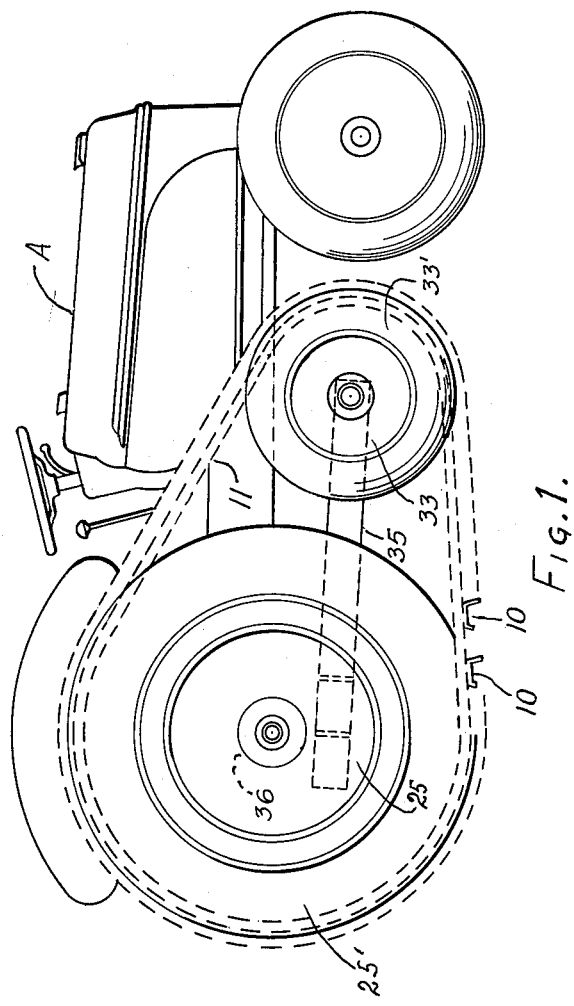
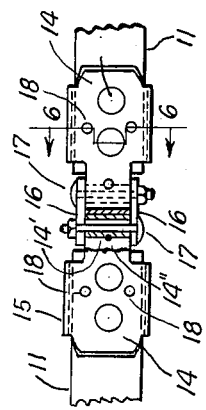
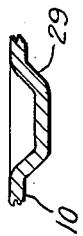
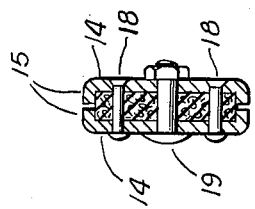
INVENTOR.
BRUNO F. ARPS
BY
ATTORNEY March 20, 1956  B. F. ARPS  2,739,017
HALF TRACK ATTACHMENT FOR TRACTORS
Filed Feb. 5, 1954  2 Sheets-Sheet 2
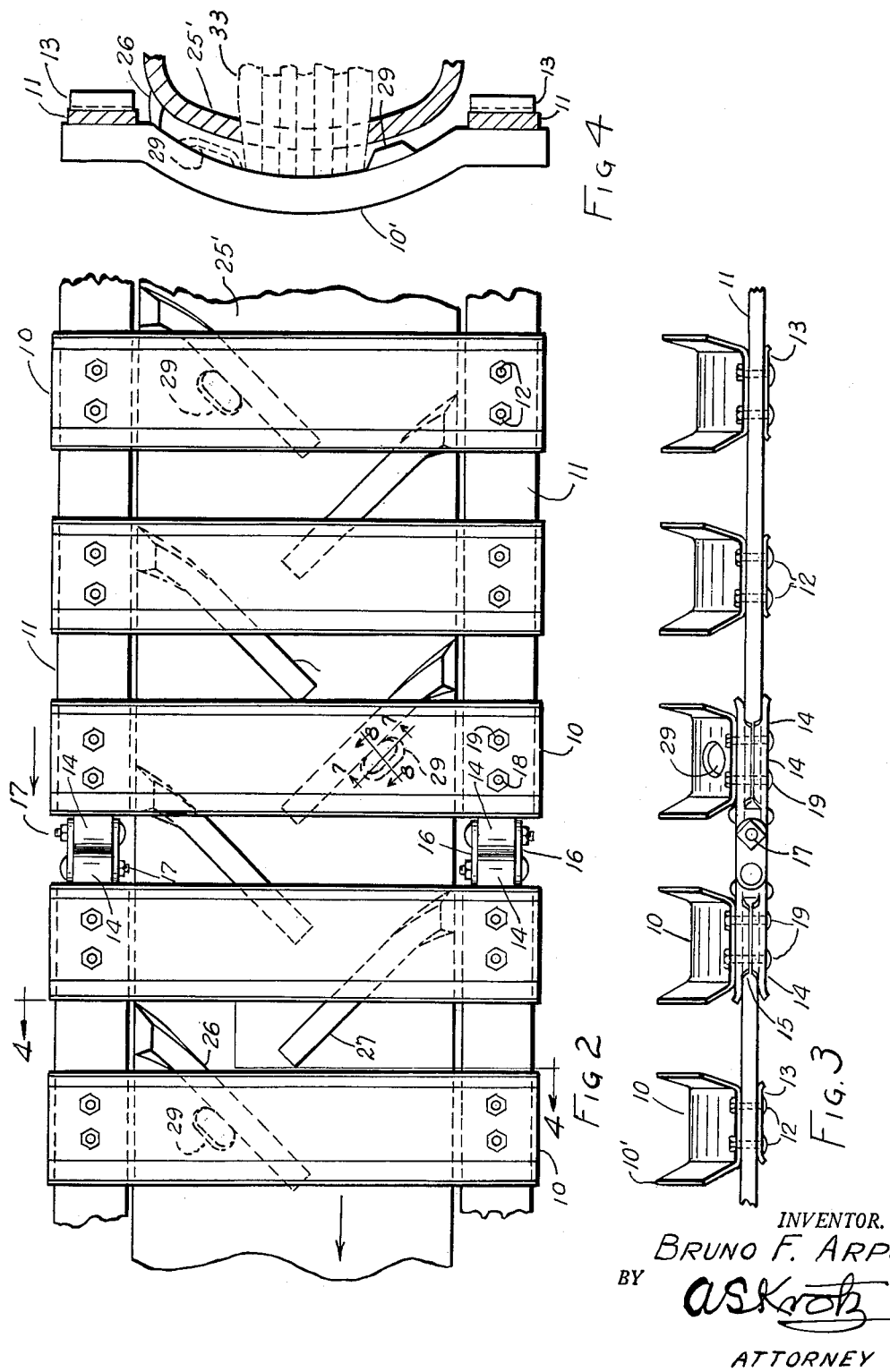
INVENTOR.
BRUNO F. ARPS
BY
AS Kroh
ATTORNEY

United States Patent Office 2,739,017
Patented Mar. 20, 1956

2,739,017

HALF TRACK ATTACHMENT FOR TRACTORS

Bruno F. Arps, New Holstein, Wis., assignor to Arps Corporation, New Holstein, Wis.

Application February 5, 1954, Serial No. 408,427

2 Claims. (Cl. 305—10)

An object of the present invention is to provide a design which is an improvement over the art and can be manufactured at low cost.

Special objects of the present invention are to provide an endless track, comprising two spaced apart belts which are secured together preferably by means of longitudinally closely spaced apart transverse cleats forming an endless track, having means which cooperate with the rubber tires on the tractor driving wheels and supplemental track carrying wheels to hold the track in transverse concentric alignment with these wheels, the means on the cleats adapted to be driven by the tractor driving wheel rubber tire lugs.

Further objects of the present invention are to provide a track which is light, can be manufactured at low cost, is efficient in operation, easily attached and detached and easily stored or prepared for shipment.

The present invention is adapted to be used in connection with standard tractors as shown and in my co-pending applications, Serial Number 213,075, filed February 28, 1951, now Pat. No. 2,702,211, and Serial Number 348,997, filed April 15, 1953, now Pat. No. 2,719,062.

To these and other useful ends my invention consists of parts, combinations of parts or their equivalents and mode of operation as described and claimed and shown in the accompanying drawings in which:

Fig. 1 is a drawing of a conventional tractor equipped with my invention largely shown by dotted lines.

Fig. 2 is a top or outside view of a short section of my improved track as laid flat on a driving wheel tire prepared therefor.

Fig. 3 is a side view of a fraction of the track as shown in Figure 2.

Fig. 4 is an end view of the track shown in Figure 2 and taken on lines 4—4 of this figure, illustrating how the track lies on the rubber tires of the driving wheels of the tractor and on the supplemental wheel tires of my attachment (shown by dotted lines).

Fig. 5 is a top view partially sectioned illustrating the manner of connecting the ends of the track together for mounting belt-like on the driving and supplemental wheels of a tractor.

Fig. 6 illustrates a sectional view taken on lines 6—6 of Figure 5.

Fig. 7 is a section taken on line 7—7 of Figure 2.

Fig. 8 is a section taken on line 8—8 of Figure 2.

As thus illustrated, the tractor is designated in its entirety by reference character A. I have disclosed important improvements over the designs referred to in my co-pending applications.

It will be noted that cleats 10 of the track, are at their ends secured to transversely spaced belts 11, consisting preferably of a suitable fabric and rubber composition, the end fastenings of cleats 10 to belts 11 being made by pairs of bolts 12, a metal plate 13 being used and shaped as shown for protecting the belts and making the cleat fastening more secure. Belts 11 are hingedly secured together at their ends as follows:

Two plates 14—14 are folded into a U shape as clearly illustrated in Figures 3 and 5, having flanges 15 which embrace the sides of the belt, the adjacent ends of members 14 being somewhat narrower than the body of the plates. I provide side links 16—16 which are held in position by bolts 17—17, the bodies of which fit into sleeves 14', the curved portion of members 14 fitting around sleeves 14'. Sleeves 14' are held into position and from turning by rivets 14'' which fit into a groove in the sleeve, thus to form hinged links, each member 14 being generally held to the ends of belts 11 by means of rivets 18—18 and bolts 19—19; thus clearly the joint between the ends of the belts and members 14 and the hinge will be as strong and firm as the belt 11 to which they are attached.

Referring now to Figure 3, it will be seen that the hinge joint between the ends of belt 11 are secured to adjacent members 10 so the spacing of all these members 10 will be the same, members 10 being secured to members 14 by means of bolts 19—19, which fit into the openings otherwise occupied by bolts 12, the lower legs of members 14 answering the same purpose as members 13.

Referring now specifically to Figures 2 and 4, the driving wheels are designated by numeral 25 having mounted thereon tires 25' having lugs 26 and 27.

It is necessary to definitely hold the track on the transverse centers of the rubber tires. Alternate lugs 26 and 27 are provided and are adapted to engage lugs 29 formed in certain cleats 10, which are preferably positioned and angled as illustrated in Figure 2, so as to engage certain rubber tire lugs 26 and 27 and act to drive and hold the track on the transverse center of tire 25' and by means of which the tracks are driven in the direction indicated by arrow in Figure 2, and also for holding the tracks concentric with supplemental wheel tires 33' by contact with the sides of these tires as shown in Figure 4.

Supplemental wheels 33 are carried by arms 35, the rear ends of which are preferably pivoted to the rear axle housing 36 of the tractor as illustrated in the referred to co-pending applications. The mounting of wheels 33 to the front end of arms 35 or of the arms 35 to the driving wheel axle housings are adjustable longitudinally as shown in either said pending applications, so belts may be easily placed on the wheels as shown in figure 1 and then adjusted to the proper tautness.

The important feature of applicant's invention is shown in Figures 2, 3 and 4 which indicates clearly that applicant's endless track will be held into position on the tires by means of lugs or projections on the cleats; that the joint between the ends of the track need not be completed at the factory but the track may be rolled into bundles or shipped in any desired manner and made endless at its destination; that an injured portion of the track may be easily replaced at the place of its use and that the track will not act to unusually wear the tires.

Having thus shown and described my invention, I claim:

1. A half track assemblage for tractors, comprising a pair of spaced-apart endless belts having transversely alined end portions, brackets secured to said belt end portions, means for detachably and hingedly securing adjacent ends of said brackets together, transverse cleats secured to said belts in spaced relation, portions of said cleats between the belts being curved outwardly to lie on the lugs of the thread of a tractor wheel, certain of said cleats being formed with projections adapted to be engaged by tractor wheel lugs, said cleats and projections cooperating to maintain said track in a transverse central position, an end portion of said track being engageable with other tractor wheels, said cleat projections being engageable with side portions of the tires of said other tractor wheels to maintain the track in a transverse central position thereon, said cleats being channeled throughout their lengths with outwardly projecting earth engaging driving flanges.

2. A half track as recited in claim 1 wherein said brackets comprise plates bent into a U-shape to embrace the flat ends of said belts and being held thereto by rivets and bolts, adjacent ends of said plates being narrowed, links positioned on said narrowed portions, bolts extending through the ends of said links and engaging the inner surface of said curved ends through sleeves to form hinges between said U-shaped plates.

References Cited in the file of this patent

UNITED STATES PATENTS

| 1,438,859 | Rimailho | Dec. 12, 1922 |
| 1,934,627 | Norelius | Nov. 7, 1933 |

FOREIGN PATENTS

| 478,066 | Canada | Oct. 30, 1951 |